United States Patent
Suzuki (10) Patent No.: US 8,887,582 B2
(45) Date of Patent: Nov. 18, 2014

(54) PIEZOELECTRIC VIBRATION TYPE FORCE SENSOR AND ROBOT APPARATUS

(75) Inventor: Hitoshi Suzuki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 13/369,254

(22) Filed: Feb. 8, 2012

(65) Prior Publication Data

US 2012/0204656 A1     Aug. 16, 2012

(30) Foreign Application Priority Data

Feb. 15, 2011    (JP) ................................. 2011-029737
Feb. 1, 2012    (JP) ................................. 2012-019708

(51) Int. Cl.
    *G01L 1/16*           (2006.01)
    *G01L 5/22*           (2006.01)

(52) U.S. Cl.
    CPC ................ *G01L 1/162* (2013.01); *G01L 5/226* (2013.01); *Y10S 901/46* (2013.01)
    USPC .......................................... 73/862.59; 901/46

(58) Field of Classification Search
    USPC ............... 901/46, 34; 73/862.59; 324/207.11, 324/207.16, 207.24
    See application file for complete search history.

(56) References Cited

U.S. PATENT DOCUMENTS

| | | | | |
|---|---|---|---|---|
| 4,546,658 A | * | 10/1985 | Rocha et al. | ................ 73/862.59 |
| 4,954,744 A | * | 9/1990 | Suzuki et al. | .................. 313/336 |
| 4,956,578 A | * | 9/1990 | Shimizu et al. | ..................... 315/3 |
| 5,052,226 A | * | 10/1991 | Schmid | ....................... 73/514.34 |
| 5,155,416 A | * | 10/1992 | Suzuki et al. | .................. 315/366 |
| 5,530,314 A | * | 6/1996 | Banno et al. | ..................... 313/310 |
| 5,645,462 A | * | 7/1997 | Banno et al. | ....................... 445/51 |
| 5,650,795 A | * | 7/1997 | Banno et al. | .................. 345/74.1 |
| 5,838,097 A | * | 11/1998 | Kasanuki et al. | ............. 313/495 |

(Continued)

FOREIGN PATENT DOCUMENTS

| | | |
|---|---|---|
| CN | 1920507 A | 2/2007 |
| CN | 101918804 A | 12/2010 |
| EP | 950889 A1 | 10/1999 |
| JP | 52-78473 | 7/1977 |

(Continued)

OTHER PUBLICATIONS

Chinese Office Action dated Nov. 29, 2013 for Chinese Appln No. 201210034199.0.

*Primary Examiner* — Hezron E Williams
*Assistant Examiner* — John DiGeronimo
(74) *Attorney, Agent, or Firm* — Fitzpatrick, Cella, Harper & Scinto (57) ABSTRACT

Provided is a piezoelectric vibration type force sensor including a vibration body including a disk-shaped piezoelectric material and a pair of drive electrodes, for vibrating in a radial direction of the piezoelectric material when an AC voltage is applied to the pair of drive electrodes, a substrate to be brought into contact with a surface on one side of the vibration body, an elastic member that is disposed to be brought into contact with a surface on another side of the vibration body, and a holding member including a contact portion and a loose-fit portion that loosely fits in the hollow through hole. The holding member fixes the contact portion and the loose-fit portion to the substrate so that movements of the vibration body in a vibration direction and in a direction orthogonal to the vibration direction are restricted for positioning.

11 Claims, 10 Drawing Sheets

(56) References Cited

U.S. PATENT DOCUMENTS

| | | | | |
|---|---|---|---|---|
| 6,157,137 | A * | 12/2000 | Suzuki et al. | 315/169.1 |
| 6,236,167 | B1 * | 5/2001 | Yamaguchi et al. | 315/169.2 |
| 6,578,421 | B1 | 6/2003 | Ishikawa et al. | |
| 7,296,473 | B2 | 11/2007 | Ishii | |
| 8,182,197 | B2 | 5/2012 | Meisho | |
| 8,365,615 | B2 * | 2/2013 | Sato et al. | 73/862.59 |
| 2013/0054027 | A1 * | 2/2013 | Miyazaki | 700/258 |

FOREIGN PATENT DOCUMENTS

| | | |
|---|---|---|
| JP | 1-260334 | 10/1989 |
| JP | 2001-349900 A | 12/2001 |
| JP | 2008-039626 A1 | 2/2008 |
| JP | 2009-198496 A | 9/2009 |
| JP | 2010-131743 A | 6/2010 |

* cited by examiner

PIEZOELECTRIC VIBRATION TYPE FORCE SENSOR AND ROBOT APPARATUS

BACKGROUND OF THE INVENTION

1. Field of the Invention

The present invention relates to a force sensor for detecting a force, and more particularly, to a piezoelectric vibration type force unit, a piezoelectric vibration type force sensor, and a robot apparatus, in which a resonance phenomenon of a piezoelectric material is utilized to detect a force applied to the piezoelectric material.

2. Description of the Related Art

Conventionally, there are known various force sensors using a strain gauge, a capacitance variation, conductive rubber, and the like. Those force sensors all utilize a deformation of a member constituting the force sensor (for example, a metal resistor in a strain gauge). Therefore, in order to realize high sensitivity and a wide range of measurement, sufficient deformation of the member is required. For this reason, there is a problem that when the sensor is downsized, sufficient deformation cannot be obtained in some cases so that accuracy may be reduced because an output signal is lost in noise.

In contrast, there is disclosed a piezoelectric vibration type force sensor using a resonance phenomenon of a piezoelectric material having a property of vibrating in a specific direction along with variation with time of a voltage amplitude when an AC voltage is applied (see Japanese Patent Application Laid-Open No. S52-78473).

As described in Japanese Patent Application Laid-Open No. S52-78473, the piezoelectric vibration type force sensor includes a piezoelectric material to which an impedance element is connected in series, and a voltage of a frequency not higher than a resonance frequency of the piezoelectric material is applied for exciting the piezoelectric material. In this state, the frequency of vibration is fixed while an external force is applied to the piezoelectric material. Then, the impedance element of the piezoelectric material is increased so that the resonance frequency is moved to the high frequency side. When an external force is applied to the piezoelectric material in the state in which the resonance frequency is moved to the high frequency side, a value of the voltage applied to the piezoelectric material changes from the value before the external force is applied. Based on this change of the voltage value, the external force applied to the piezoelectric material can be calculated in a quantitative manner. Because the piezoelectric vibration type force sensor has a large change of the voltage amplitude under a small load, the piezoelectric vibration type force sensor has an advantage of high detection sensitivity (see FIG. 4 to be described later).

Now, through different from the piezoelectric vibration type force sensor, for reference, a method of mounting a piezoelectric material onto a piezoelectric force sensor is described with reference to Japanese Patent Application Laid-Open No. H01-260334. Japanese Patent Application Laid-Open No. H01-260334 discloses a structure of a piezoelectric force sensor that detects contact pressure distribution based on voltages generated from multiple piezoelectric materials (piezoelectric elements) arranged in matrix. The piezoelectric force sensor described in Japanese Patent Application Laid-Open No. H01-260334 includes a pressure plate for detecting a force, which is disposed on the side to which the force is applied, and a pressure plate disposed above the piezoelectric material so that the pressure plate can make press-contact with the upper end of the piezoelectric material. Therefore, for example, if a defect occurs in a part of the multiple piezoelectric materials, the piezoelectric material can be accessed easily by removing the pressure plate.

Incidentally, the piezoelectric vibration type force sensor is used in a state in which the piezoelectric material is vibrated by applying a voltage. Therefore, it is necessary to adopt a mounting structure for applying an AC voltage to a drive electrode attached to the piezoelectric material in a state in which the piezoelectric material can vibrate. For instance, it is necessary to adopt a mounting structure for supplying electric power to the piezoelectric material while holding the vibrating piezoelectric material at a predetermined position.

In this regard, for example, it is conceivable to fix the piezoelectric material with a fixing attachment or an adhesive as in the piezoelectric force sensor disclosed in Japanese Patent Application Laid-Open No. H01-260334. However, the piezoelectric vibration type force sensor is used in a state in which an AC voltage is applied to the piezoelectric material to vibrate, and hence if the piezoelectric material is fixed with a member having high stiffness in the vibration direction, or if a frictional surface of the piezoelectric material is fixed with an adhesive, vibration of the piezoelectric material is suppressed. Therefore, in a mounting structure in which the piezoelectric material is fixed to suppress the vibration, a detected value for a change of small vibration amplitude is decreased so that sensitivity is lowered. In addition, if a vibration amount is changed depending on a fixing manner with a fixing attachment or an adhesive despite the same AC voltage is applied to vibrate, a value of the sensor becomes unstable.

SUMMARY OF THE INVENTION

Therefore, an object of the present invention is to provide a piezoelectric vibration type force sensor that allows easy mounting of a piezoelectric material without lowering detection sensitivity.

According to an exemplary embodiment of the present invention, there is provided a piezoelectric vibration type force sensor, including: a vibration body including a ring-shaped piezoelectric material having a hollow through hole and a pair of drive electrodes attached to both sides of the piezoelectric material, for vibrating in a spreading direction of the piezoelectric material when an AC voltage is applied to the pair of drive electrodes; a substrate to be brought into contact with a surface on one side of the vibration body; an elastic member that is disposed to be brought into contact with a surface on another side of the vibration body, for transmitting a force applied externally to the vibration body by elastic deformation; a holding portion including a contact portion that is larger than the hollow through hole so as to be brought into contact with the surface on the another side of the vibration body, and a loose-fit portion that loosely fits in the hollow through hole, the loose-fit portion being fastened to the substrate; and a pair of signal electrodes for applying the AC voltage to the pair of drive electrodes.

According to exemplary embodiments of the present invention, there are provided a robot hand and a robot arm including the above-mentioned piezoelectric vibration type force sensor.

Therefore, according to the exemplary embodiments of the present invention, there may be provided a piezoelectric vibration type force sensor and a robot apparatus that allow easy mount of the piezoelectric material without lowering detection sensitivity.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

Hereinafter, a piezoelectric vibration type force sensor (hereinafter, referred to as a "force sensor") according to embodiments of the present invention is described with reference to the attached drawings. The force sensor according to the embodiments is a voltage vibration type force sensor using a resonance phenomenon of a piezoelectric material that vibrates in a radial direction of the piezoelectric material when an AC voltage is applied (expanding vibration).

Embodiment 1

Figure 1A:
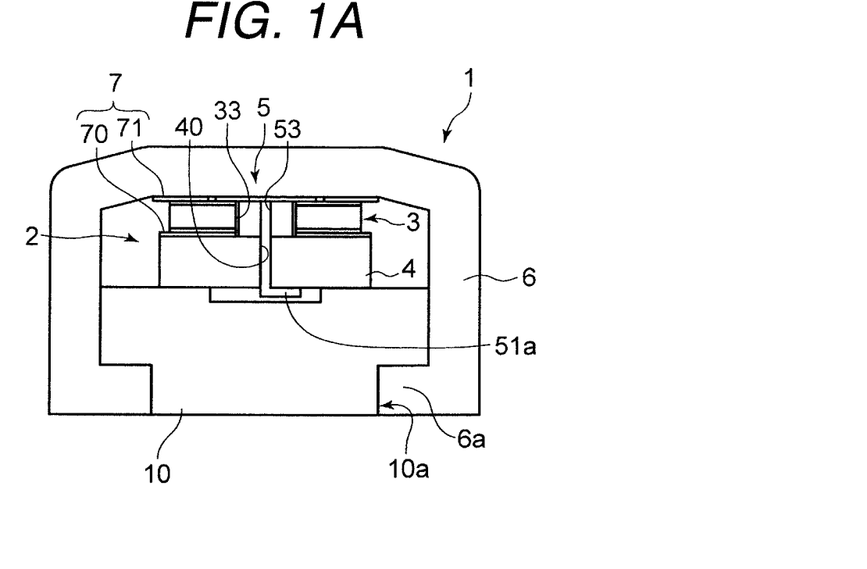
FIG. 1A is a cross sectional view schematically illustrating a state in which a force sensor according to Embodiment 1 of the present invention is mounted to a robot finger.
Figure 1B:
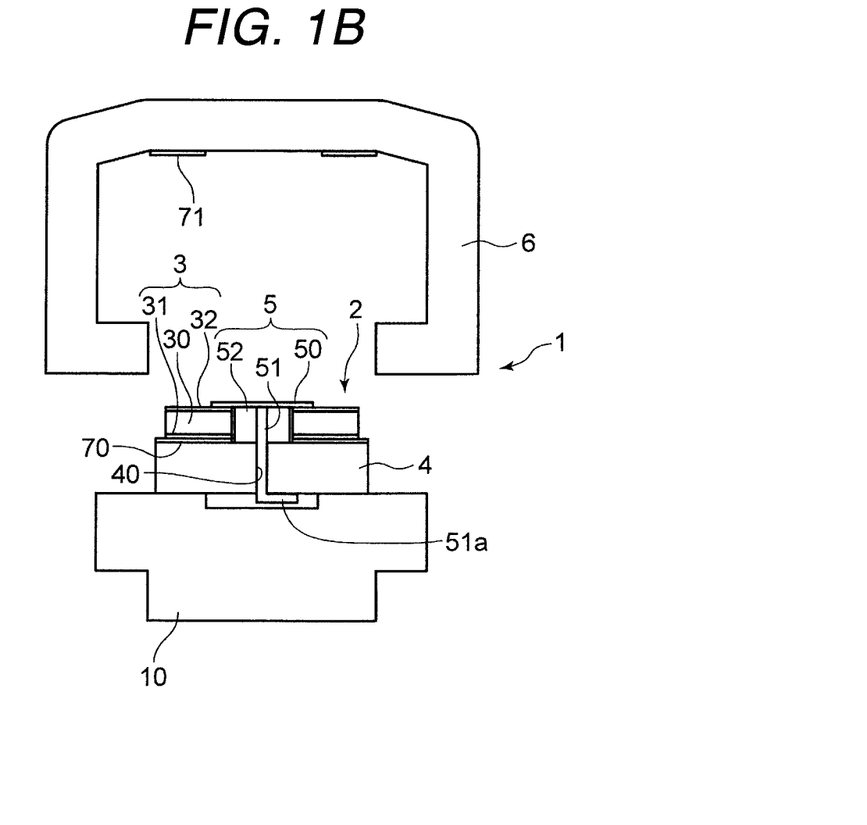
FIG. 1B is a cross sectional view illustrating a state in which a damping member of the force sensor illustrated in FIG. 1A is removed.
Figure 2A:
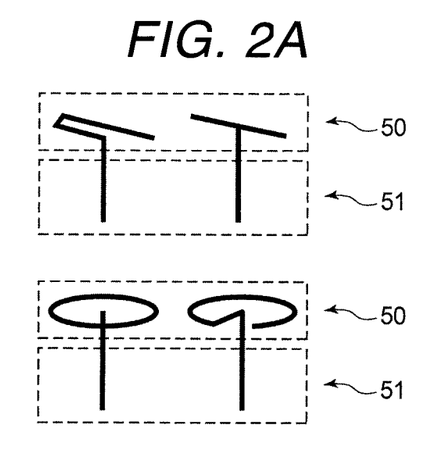
FIG. 2A is a diagram illustrating another form of a holding member of the force sensor according to Embodiment 1 of the present invention.
Figure 2B:
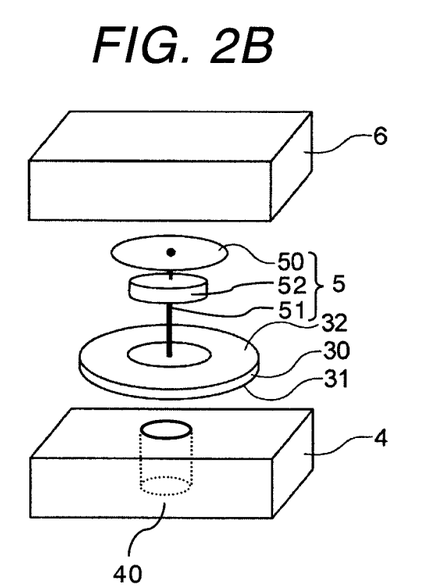
FIG. 2B is an exploded perspective view schematically illustrating the force sensor according to Embodiment 1 of the present invention.
Figure 2C:
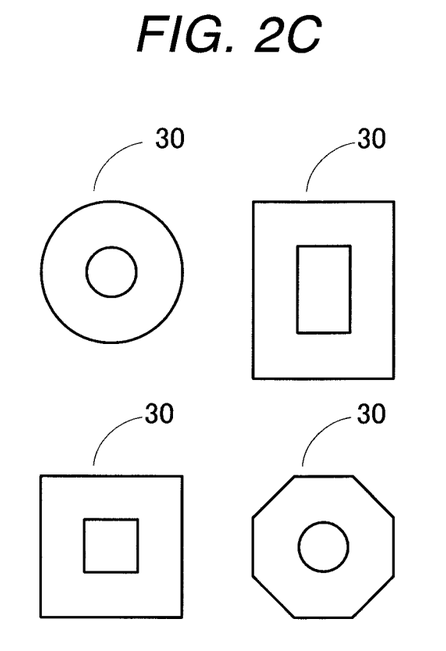
FIG. 2C is a top view schematically illustrating another form of a vibration body according to Embodiment 1 of the present invention.
Figure 3:
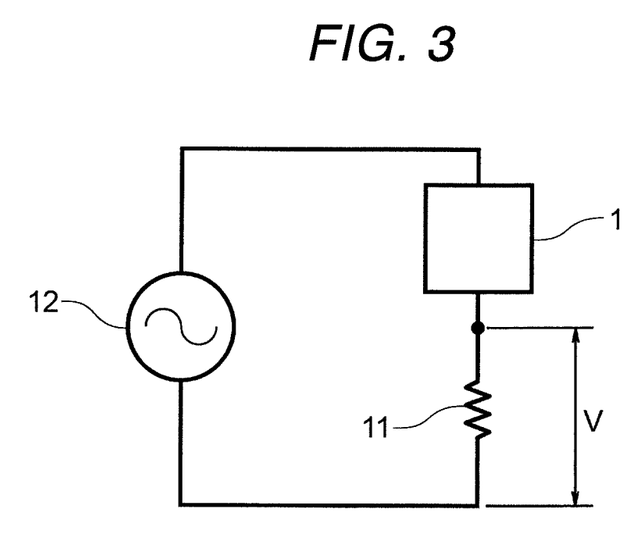
FIG. 3 is a diagram schematically illustrating a circuit block diagram of a force sensor device using the force sensor according to Embodiment 1 of the present invention.
Figure 4:
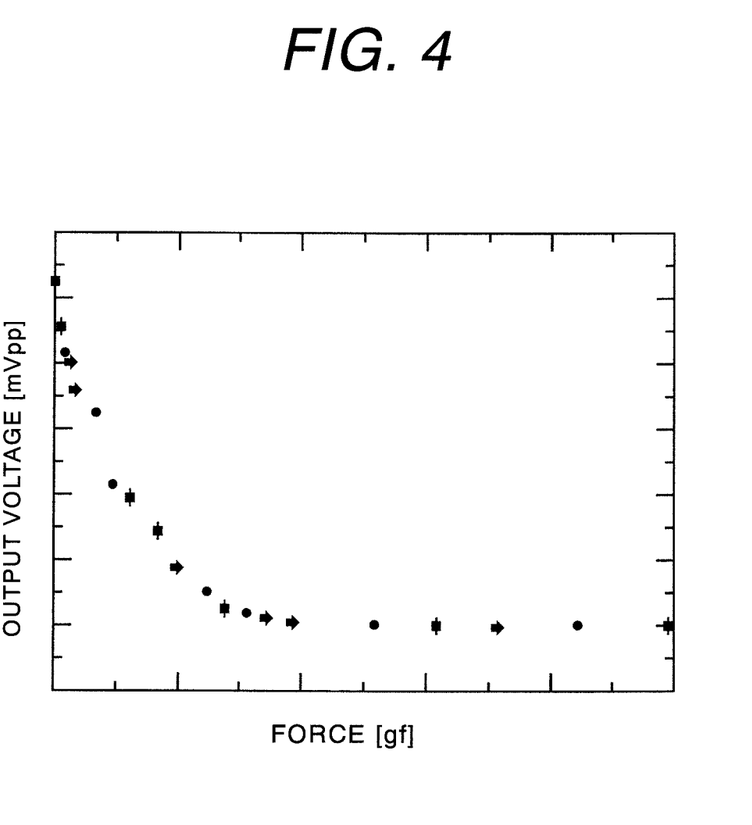
FIG. 4 is a diagram illustrating a relationship between an external force applied to the force sensor according to Embodiment 1 of the present invention and an output voltage.

A force sensor 1 according to Embodiment 1 of the present invention is described with reference to FIG. 1A to FIG. 4. FIG. 1A is a cross sectional view schematically illustrating a state in which the force sensor 1 according to Embodiment 1 of the present invention is mounted on a robot finger 10. FIG. 1B is a cross sectional view illustrating a state in which a damping member 6 of the force sensor 1 illustrated in FIG. 1A is removed. FIG. 2A is a diagram illustrating another form of a holding member 5 of the force sensor 1 according to Embodiment 1 of the present invention. FIG. 2B is an exploded perspective view schematically illustrating the force sensor 1 according to Embodiment 1 of the present invention. FIG. 2C is a diagram illustrating another form of a vibration body 3 of the sensor 1 according to Embodiment 1 of the present invention. FIG. 3 is a diagram schematically illustrating a circuit block diagram of a force sensor device using the force sensor 1 according to Embodiment 1 of the present invention. FIG. 4 is a diagram illustrating a relationship between an external force applied to the force sensor 1 according to Embodiment 1 of the present invention and an output voltage thereof.

As illustrated in FIGS. 1A to 2B, the force sensor 1 includes the vibration body 3, a substrate 4 that contacts with a surface on one side of the vibration body 3 and that a second through hole 40 is formed, the damping member 6 as an elastic member disposed so as to contact with a surface on the other side of the vibration body 3, the holding member 5 as a positioning unit, and a signal electrode 7. Note that, the vibration body 3, the substrate 4, the damping member 6, and the holding member 5 constitute a piezoelectric vibration type force unit (hereinafter, referred to as a "force unit 2").

The vibration body 3 is formed in a disk-like shape with a hollow through hole 33 (hereinafter, referred to as an "annular shape") and includes a piezoelectric material 30 formed in an annular shape, and a first drive electrode 31 and a second drive electrode 32 as a pair of drive electrodes formed in the annular shape. As a matter of course, a shape of the vibration body 3 may be a ring-like shape other than an annular shape, but it is supposed that the vibration body 3 has an annular shape in the following description, for convenience sake of description.

The piezoelectric material 30 is formed of a piezoelectric element such as crystal, barium titanate, polyvinylidene fluoride, and is manufactured by polarizing the piezoelectric element to determine the vibration direction and then cutting out in an annular shape so that the vibration direction becomes the radial direction (expanding vibration). As to the vibration direction of the piezoelectric material 30, a main vibration direction is determined by the cut out shape of the piezoelectric material 30 so that a primary mode direction of the vibration can be determined.

The first drive electrode 31 and the second drive electrode 32 are attached to both sides of the piezoelectric material 30. Specifically, the first drive electrode 31 is attached to a surface on one side of the piezoelectric material 30 (vibration body 3), and the second drive electrode is attached to a surface on the other side of the piezoelectric material (vibration body 3). The piezoelectric material 30 (vibration body 3) vibrates when the AC voltage (time-varying voltage) is applied to the first drive electrode 31 and the second drive electrode 32. When the piezoelectric material 30 vibrates, the first drive electrode 31 and the second drive electrode 32 attached to the both sides of the piezoelectric material 30 are also vibrated. In other words, the vibration body 3 is vibrated.

The substrate 4 is used for disposing the vibration body 3. In addition, the substrate 4 has a second through hole 40 in which a connecting shaft 51 described later can be inserted. The second through hole is formed in a direction orthogonal to the vibration direction of the vibration body 3 (the same direction as a first through hole 53 described later), and is formed for allowing the connecting shaft 51 to pass through so as to position the vibration body 3.

The damping member 6 is made of an elastic material such as silicone or urethane that can be deformed elastically and transmits a force applied from the outside to the vibration body 3 by the elastic deformation. In addition, the damping member 6 has an engaging portion 60 that can engage with an engaged portion 10a formed on the robot finger 10. The damping member 6 has a structure in which the engaging portion 60 engages with the engaged portion 10a of the robot finger 10 so that the damping member 6 contacts with the surface on the other side of the vibration body 3, and in this state, the damping member 6 can be attached to and removed from the robot finger 10. Therefore, for example, even when the damping member 6 is worn out, instead of replacing the force sensor 1, it is sufficient to replace only the damping member 6 without a second signal electrode 71, and the replacement can be easily performed.

The holding member 5 includes a contact portion 50 that has a diameter larger than the hollow through hole 33 of the vibration body 3 and contacts with the surface on the other side of the vibration body 3, a loose-fit portion 52 that loosely fits in the hollow through hole 33 of the vibration body 3, and the connecting shaft 51 as a fastening member for fastening the contact portion 50 and the loose-fit portion 52 to the substrate 4. In Embodiment 1, the contact portion 50, the connecting shaft 51, and the loose-fit portion 52 are made of an insulating material. Note that although the loose-fit portion 52 is shown as an insulating material in FIGS. 1A and 1B, it is good that only electrical insulation is maintained. When the insulating material is used for the loose-fit portion, positioning is easy. When a vacant space is used for the loose-fit portion, cost may be reduced. If electrical insulation is ensured, the contact portion 50 and the connecting shaft 51 may be made of a metal. When a metal is used, strength is secured and processing is easy.

The contact portion 50 contacts with the vibration body 3 so that the vibration body 3 can vibrate freely in the radial direction and restricts movement of the vibration body 3 in the direction orthogonal to the vibration direction. For instance, the contact portion 50 may be T-shaped, U-shaped, or thumbtack-shaped as illustrated in FIG. 2A. If a stick-like insulating material is worked to form the substantially same shape (substantially circular shape), there is an advantage in cost. The contact portion 50 of the holding member 5 does not drop out from the hollow through hole 33 if the contact portion 50 is larger than the hollow through hole 33 of the vibration body 3, and does not protrude from the outer rim of the vibration body 3 if the contact portion 50 is smaller than the outer periphery of the vibration body 3. If the contact portion 50 has such a shape, the force sensor 1 can fix the vibration body 3 to the substrate 4 securely with the holding member 5.

The loose-fit portion 52 is formed in a cylindrical shape so that a predetermined gap is formed between the loose-fit portion 52 and the hollow through hole 33 of the vibration body 3. The loose-fit portion 52 performs positioning of the vibration body 3 in a state in which the vibration body 3 can vibrate in the radial direction, and restricts movement of the vibration body 3 in the vibration direction. In addition, the loose-fit portion 52 has the first through hole 53 in which the connecting shaft 51 can be inserted. The first through hole 53 is formed on the center axis of the loose-fit portion 52 formed in a cylindrical shape and is formed coaxially with the second through hole 40. In other words, the first through hole 53 is formed in the direction orthogonal to the vibration direction of the vibration body 3 (in the same direction as the second through hole 40). Note that, the loose-fit portion 52 may be formed integrally with the substrate 4, if the substrate 4 is made of an elastic material such as rubber.

The connecting shaft 51 is connected to the contact portion 50 at its one end and is formed to pass through the first through hole 53 and the second through hole 40. After the connecting shaft 51 passes through the first through hole 53 and the second through hole 40, another end portion 51a of the connecting shaft 51 is bent so that the contact portion 50 and the loose-fit portion 52 are fastened to the substrate 4 in the state in which the vibration body 3 can vibrate.

The signal electrode 7 includes a first signal electrode 70 that is attached to a surface of the substrate 4, which is to contact with the surface on the one side of the vibration body 3, and contacts with the first drive electrode 31, and the second signal electrode 71 that is attached to the damping member 6 and contacts with the second drive electrode 32. The first signal electrode 70 and the second signal electrode 71 are used for applying the AC voltage to the first drive electrode 31 and the second drive electrode 32, respectively.

As illustrated in FIG. 3, to the force sensor 1 having the structure described above, a voltage having a frequency close to the resonance frequency of the piezoelectric material 30 is applied from a variable frequency oscillator 12 via an impedance 11 including a resistor or the like, to thereby vibrate the vibration body 3. In this state, if a force is applied to the damping member 6, the damping member 6 restricts the vibration of the vibration body 3. Thus, impedance of the piezoelectric material 30 is increased, and hence an amplitude of the voltage across the impedance 11 changes. As a result, a relationship between the force and the output voltage can be plotted as illustrated in FIG. 4, and the force can be detected from the changing impedance. As illustrated in FIG. 4, the force sensor 1 has a large variation of the voltage amplitude in a small load. Therefore, the force sensor 1 has an advantage of high detection sensitivity.

The force sensor 1 according to Embodiment 1 having the above-mentioned structure can restrict the vibration of the vibration body 3 by a friction force generated between the surface on the one side of the vibration body 3 and the contact surface of the contact portion 50 of the holding member 5, or a friction force generated between the surface on the other side of the vibration body 3 and the contact surface of the signal electrode 70. Note that, if the contact portion 50 is disposed substantially in parallel with the vibration direction so as not to cross the vibration direction of the vibration body 3, it is advantageous for mounting because direct interference with the vibration surface of the vibration body 3 is suppressed.

In this way, although the conventional piezoelectric vibration type force sensor directly restricts the vibration of the vibration body 3 from the direction orthogonal to the vibration direction by bringing the contact portion into contact with the vibration surface and by using an external force F, the force sensor 1 restricts the vibration of the vibration body 3 in the radial direction by a friction force μF where a dynamic friction coefficient is denoted by μ. Therefore, theoretically, if μ is 0.5, it is possible to detect a force up to approximately twice that in the case where the vibration is directly restricted as in the conventional case. In addition, if μ is 0.1, it is possible to detect a force up to approximately 10 times the same. In other words, the force sensor 1 can detect a static force in a wide range by using a friction force for restricting the vibration.

In addition, in the force sensor 1 according to Embodiment 1 of the present invention, the piezoelectric material 30 (vibration body 3) has an annular shape. Therefore, positioning of the vibration body 3 can be easily performed using the hollow through hole 33. In the above description, the piezoelectric material 30 (vibration body 3) has an annular shape, but the piezoelectric material 30 does not need to have an annular shape. The piezoelectric material 30 may have other shape having the hollow through hole as illustrated in FIG. 2C so that the same effect can be obtained.

In addition, there is no limitation of the material of the substrate 4. For instance, when the substrate 4 is a printed circuit board, the first signal electrode 70 is formed on a surface of the substrate 4 to be the contact surface with the vibration body 3, and the first signal electrode 70 contacts with the first drive electrode 31 of the vibration body 3. With this structure, the first signal electrode 70 can be formed by patterning. For instance, it is possible to mount a connector so that connection to the impedance 11 and a drive source (not shown) can be performed easily. In addition, if the substrate 4 is made of an elastic material such as rubber, the vibration body 3 is sandwiched between the substrate 4 and the damping member 6 so that the vibration can be more restricted with respect to a force. Therefore, the detection sensitivity can be more enhanced.

In addition, the force sensor 1 according to Embodiment 1 of the present invention is equipped with the holding member 5 including the contact portion 50 disposed to contact with the surface on the other side of the vibration body 3 having an annular shape, the loose-fit portion 52 that is to loosely fit in the hollow through hole 33, and the connecting shaft 51 for fastening the contact portion 50 and the loose-fit portion 52 to the substrate 4. The force sensor 1 has the holding member 5, and hence it becomes easy to hold the vibration body 3 at a desired position. In addition, the holding member 5 can hold the vibration body 3 in a state in which the vibration of the vibration body 3 is not interfered with, and hence it is possible to suppress a decrease of detection sensitivity due to interference of the vibration.

In addition, the force sensor 1 according to Embodiment 1 utilizes an action of the vibration body 3 having an annular shape to expand and contract in the spreading direction, and hence it is necessary to use a holding method in consideration of the vibration direction. However, the force sensor 1 changes the detected value by a friction between the vibration body 3 and the first signal electrode 70 as well as the second signal electrode 71. Therefore, as a contact surface area between the vibration body 3 and the first signal electrode 70 as well as the second signal electrode 71 is larger, setting of detection range can be changed more easily.

In addition, if the vibration body 3 (piezoelectric material 30) has an annular shape, the inner circumference length is smaller than the outer circumference length, and hence an influence on the vibration is smaller in the inner circumference portion. Therefore, in the method of mounting the vibration body 3 according to Embodiment 1, it is possible not only to facilitate positioning of the vibration body 3 but also to reduce an influence on the expansion and contraction, and on the frictional surface to be smaller than those in the case where the vibration body 3 is fixed at the outer circumference portion of the vibration body 3. Thus, stable detection can be performed. In particular, when the sensor is used as a force sensor for measuring a distribution of force, the method is effective because positions and detection values of the distributed vibration bodies 3 (piezoelectric materials 30) can be precisely obtained.

In this way, in the force sensor 1 according to Embodiment 1 of the present invention, the substrate 4 holds the vibration body 3 (piezoelectric material 30) having an annular shape using the holding member 5. Therefore, without lowering the detection sensitivity, the piezoelectric material can be easily mounted on a body for mounting (for example, the robot finger 10). In addition, the force sensor 1 according to Embodiment 1 can perform stable sensing because the mounting position of the vibration body 3 (piezoelectric material 30) becomes precise. In addition, the damping member 6 that is worn out can be easily replaced. Thus, maintainability can be improved. In other words, it is possible to provide the piezoelectric vibration type force sensor 1 that can be mounted easily and can detect a static force in a wide range.

Embodiment 2

Figure 5A:
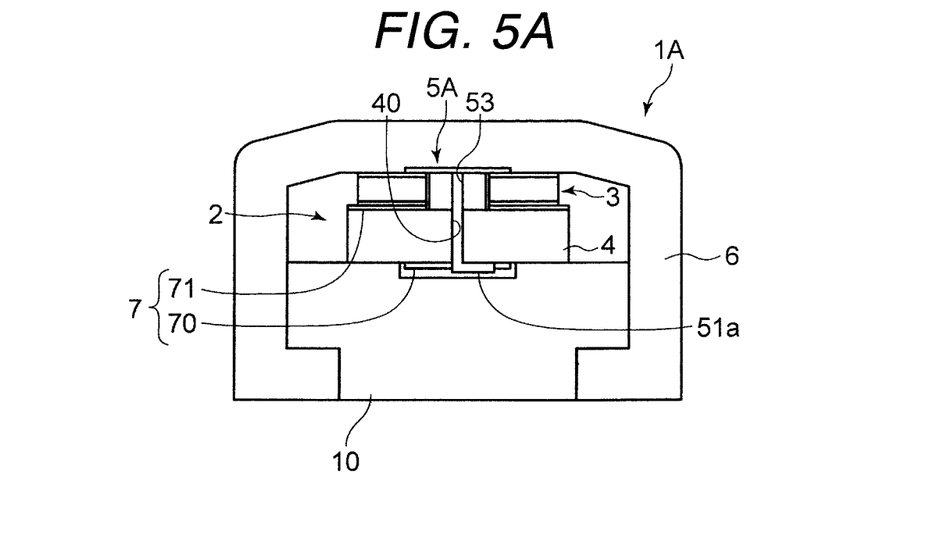
FIG. 5A is a cross sectional view schematically illustrating a state in which a force sensor according to Embodiment 2 of the present invention is mounted on the robot finger.
Figure 5B:
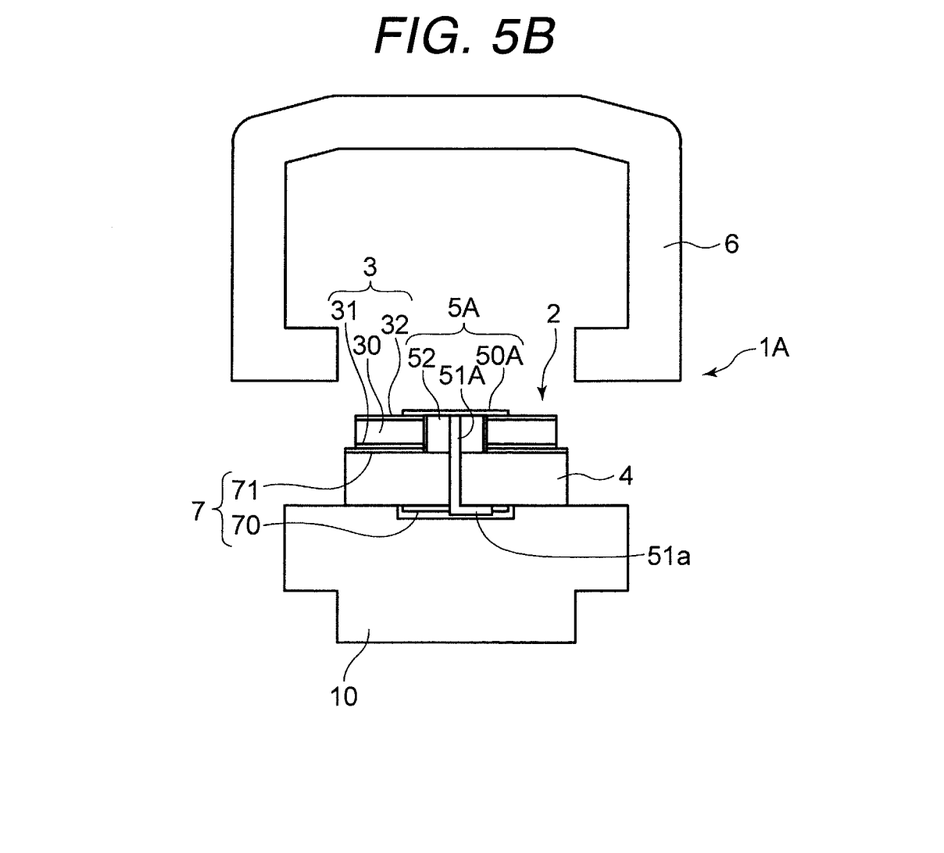
FIG. 5B is a cross sectional view schematically illustrating a state in which the damping member of the force sensor illustrated in FIG. 5A is removed.

Next, a force sensor 1A according to Embodiment 2 of the present invention is described with reference to FIGS. 5A and 5B. FIG. 5A is a cross sectional view schematically illustrating a state in which the force sensor 1A according to Embodiment 2 of the present invention is mounted on the robot finger 10. FIG. 5B is a cross sectional view schematically illustrating a state in which the damping member 6 of the force sensor 1A illustrated in FIG. 5A is removed.

As illustrated in FIGS. 5A and 5B, the force sensor 1A according to Embodiment 2 is different from Embodiment 1 in location of the second signal electrode 70. Therefore, in Embodiment 2, the point different from Embodiment 1, namely, the layout of the second signal electrode 70 is mainly described, and a member having the same structure as the force sensor 1 of Embodiment 1 is denoted by the same reference symbol, and description thereof is omitted. Note that, in Embodiment 2, a member having the same structure as in Embodiment 1 has the same effect as in Embodiment 1.

In the force sensor 1A according to Embodiment 2, the second signal electrode 70 is attached to a rear surface of the substrate 4. In addition, in the force sensor 1A, a contact portion 50A and a connecting shaft 51A of a holding member 5A are each formed of a conductive material, and the another end portion 51a of the connecting shaft 51A contacts with the second signal electrode 70. In other words, the force sensor 1A according to Embodiment 2 has a structure in which the second signal electrode 70 is electrically connected to the second drive electrode 32 via the connecting shaft 51 and the contact portion 50.

Note that, the contact portion 50A and the connecting shaft 51A only need to have conductivity, and are preferably made of metal in view of processability and cost. In addition, if a thickness of the contact portion 50A is too large in the vibration direction of the vibration body 3, a gap may be generated between the contact portion 50A and the damping member 6 and may inhibit the friction. Therefore, the thickness of the contact portion 50A is preferred to be 0.05 to 5 mm, for example, though the thickness can be different depending on a force to be detected or a size of the vibration body 3 (piezoelectric material 30).

The force sensor 1A according to Embodiment 2 having the above-mentioned structure is not required to have the second signal electrode 70 on the damping member 6. Therefore, for example, when the damping member 6 is replaced, it is sufficient to replace only the damping member 6. Thus, the replacement can be easily performed, and maintenance cost and the like can be reduced. In this way, even when a surface of the damping member 6 is worn out or damaged by an external force that is applied, the damping member 6 can be replaced easily and readily.

In addition, if the substrate 4 is a printed circuit board, wirings in matrix can be easily connected to the second signal electrode 70 by patterning in a multilayer substrate or the like.

Embodiment 3

Figure 6A:
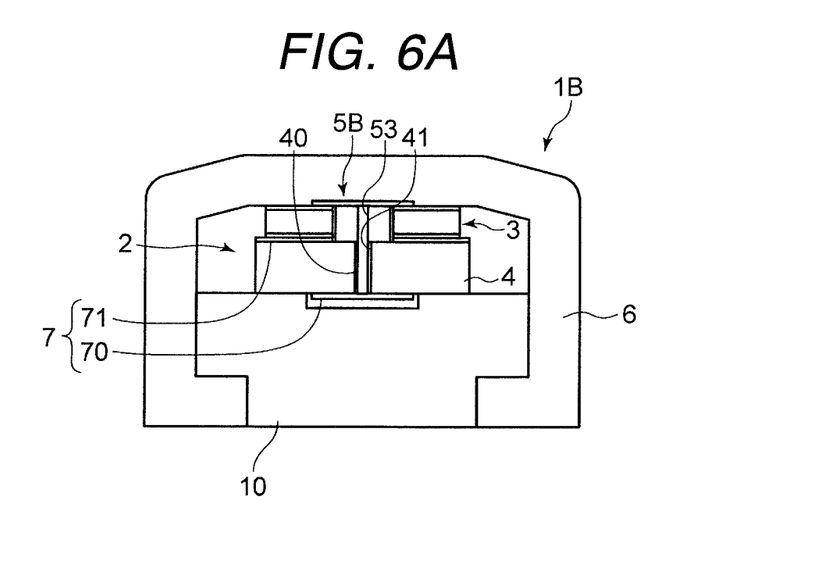
FIG. 6A is a cross sectional view schematically illustrating a state in which a force sensor according to Embodiment 3 of the present invention is mounted on the robot finger.
Figure 6B:
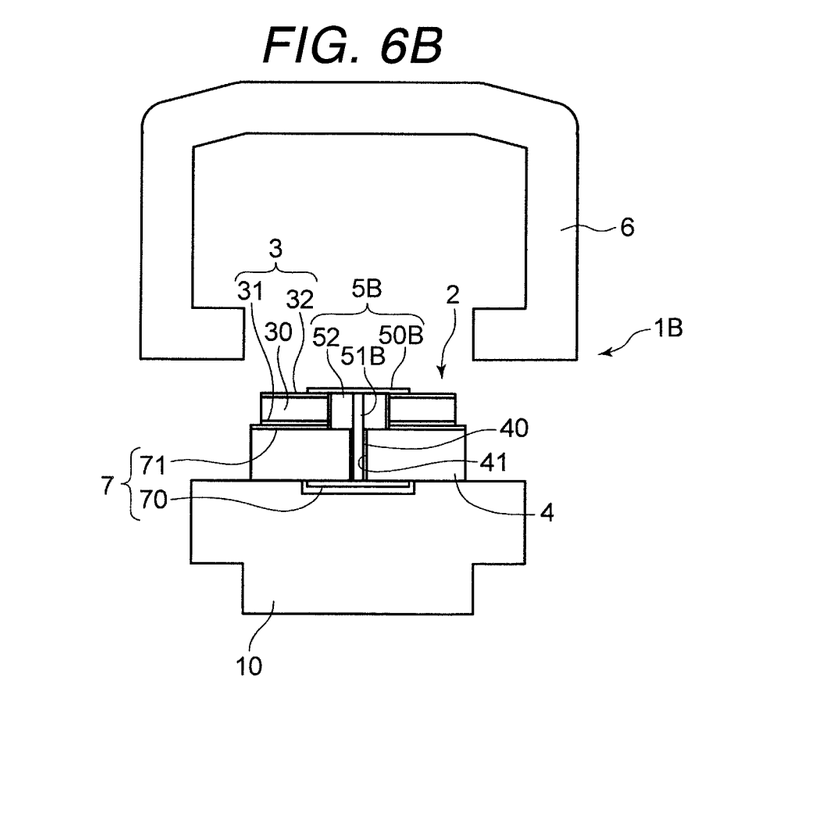
FIG. 6B is a cross sectional view schematically illustrating a state in which the damping member of the force sensor illustrated in FIG. 6A is removed.

Next, a force sensor 1B according to Embodiment 3 of the present invention is described with reference to FIGS. 6A and 6B. FIG. 6A is a cross sectional view schematically illustrating a state in which the force sensor 1B according to Embodiment 3 of the present invention is mounted on the robot finger 10. FIG. 6B is a cross sectional view schematically illustrating a state in which the damping member 6 of the force sensor 1B illustrated in FIG. 6A is removed.

As illustrated in FIGS. 6A and 6B, the force sensor 1B according to Embodiment 3 is different from Embodiment 2 in a method of fastening the holding member 5 to the substrate 4. Therefore, in Embodiment 3, the point different from Embodiment 2, namely, the method of fastening the holding member 5 is mainly described, and a member having the same structure as the force sensor 1 of Embodiment 1 and Embodiment 2 is denoted by the same reference symbol, and description thereof is omitted. Note that, in Embodiment 3, a member having the same structure as in Embodiment 1 and Embodiment 2 has the same effect as in Embodiment 1 and Embodiment 2.

The force sensor 1B according to Embodiment 3 includes a socket 41 as a press fit member disposed in the second through hole 40 formed in the substrate 4, and has a structure in which a connecting shaft 51B is pressed to fit in the socket 41 so that a contact portion 50B and the loose-fit portion 52 are fastened to the substrate 4. In addition, the second signal electrode 70 is disposed on the rear surface of the substrate 4 and is connected to the socket 41. The connecting shaft 51B and the contact portion 50B are each made of a conductive material. In other words, the connecting shaft 51B is pressed to fit in the socket 41, and hence the second signal electrode 71 is electrically connected to the second drive electrode 32 via the connecting shaft 51B and the contact portion 50B.

Note that, the contact portion 50A and the connecting shaft 51A only need to have conductivity and are preferably made of metal in view of processability and cost. In addition, if a thickness of the contact portion 50A is too large in the vibration direction of the vibration body 3, a gap may be generated between the contact portion 50A and the damping member 6 and may inhibit the friction. Therefore, the thickness of the contact portion 50A is preferred to be 0.05 to 5 mm, for example, though the thickness can be different depending on a force to be detected or a size of the vibration body 3 (piezoelectric material 30).

The force sensor 1B according to Embodiment 3 having the above-mentioned structure is not required to have the second signal electrode 70 on the damping member 6. Therefore, for example, when the damping member 6 is replaced, it is sufficient to replace only the damping member 6. Thus, the replacement can be easily performed, and maintenance cost and the like can be reduced. In this way, even when a surface of the damping member 6 is worn out or damaged by an external force that is applied, the damping member 6 can be replaced easily and readily.

In addition, in the case where the substrate 4 is a printed circuit board, there is a merit that wirings of the multiple sensors in matrix, for example, can be easily connected by patterning using a multilayer substrate structure.

In addition, the contact portion 50B and the loose-fit portion 52 can be fastened to the substrate 4 only by the press-fit of the connecting shaft 51B to the socket 41, and hence a holding member 5B can be easily attached and removed. In this way, for example, replacement of the vibration body 3 can be easily performed.

Embodiment 4

Figure 7:
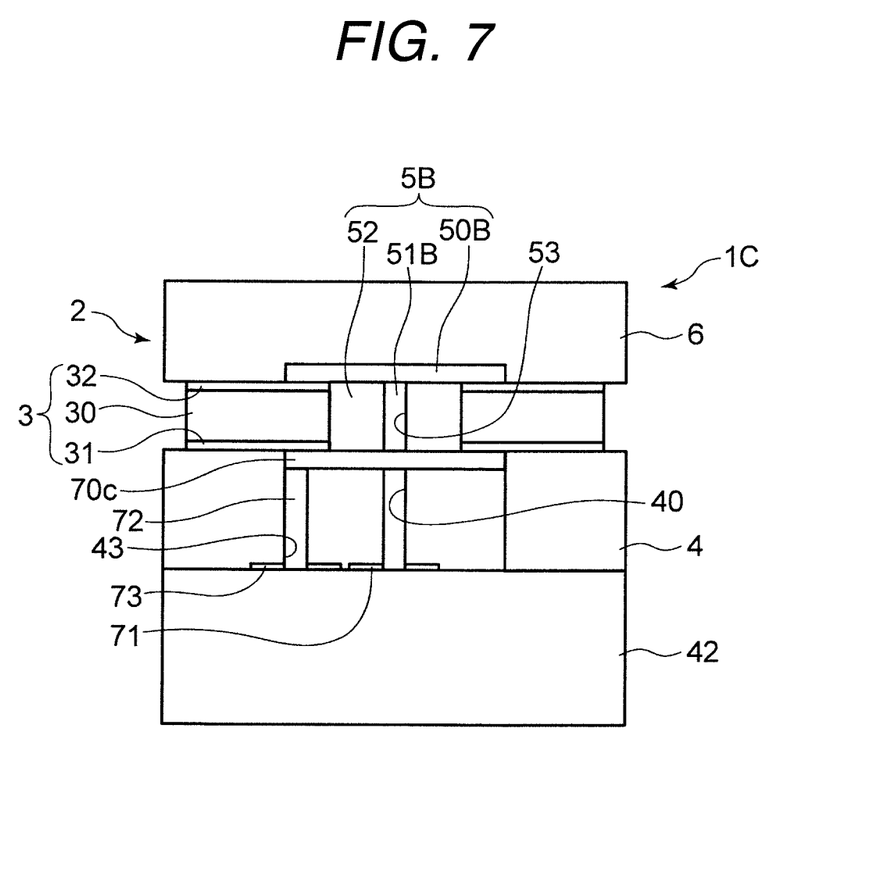
FIG. 7 is a cross sectional view schematically illustrating a force sensor according to Embodiment 4 of the present invention.
Figure 8:
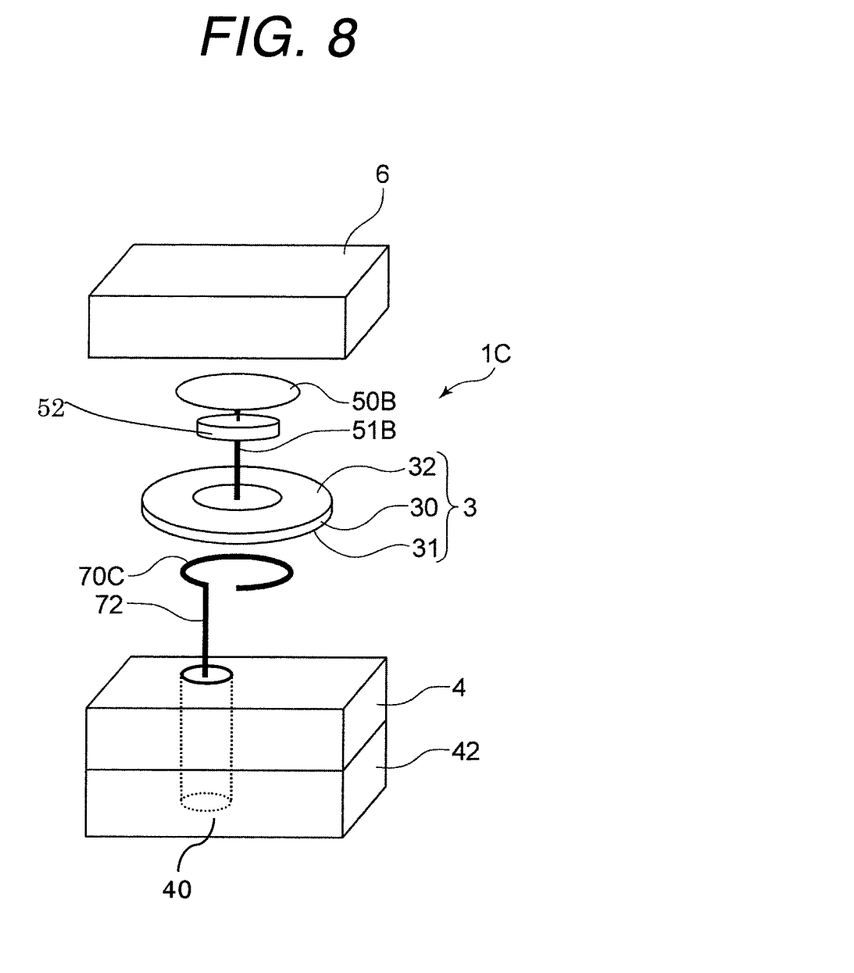
FIG. 8 is an exploded perspective view of the force sensor illustrated in FIG. 7.

Next, a force sensor 1C according to Embodiment 4 of the present invention is described with reference to FIGS. 7 and 8. FIG. 7 is a cross sectional view schematically illustrating the force sensor 1C according to Embodiment 4 of the present invention. FIG. 8 is an exploded perspective view of the force sensor 1C illustrated in FIG. 7.

As illustrated in FIG. 7, the force sensor 1C according to Embodiment 4 is different from Embodiment 3 in that the first signal electrode 70 and the second signal electrode 71 are disposed on the rear surface of the substrate 4. Therefore, in Embodiment 4, the different point from Embodiment 3, namely, the layout of the signal electrode 7 is mainly described, and a member having the same structure as Embodiments 1 to 3 is denoted by the same reference symbol, and description thereof is omitted. Note that, in Embodiment 4, a member having the same structure as in Embodiments 1 to 3 has the same effect as in Embodiments 1 to 3.

In the force sensor 1C according to Embodiment 4, a third through hole 43 is formed in parallel to the second through hole 40 in the substrate 4, and a third signal electrode 73 is disposed in parallel to the second signal electrode 71 on the rear surface of the substrate 4 at the third through hole 43. In addition, a conductive lead-in shaft 72 extends from the first signal electrode 70, and the lead-in shaft 72 passes through the third through hole to contact with the third signal electrode 73. In other words, the force sensor 1C according to Embodiment 4 has a structure in which the third signal electrode 73 is electrically connected to the first drive electrode 31 via the lead-in shaft 72, and the second signal electrode 70 is electrically connected to the second drive electrode 32 via the connecting shaft 51B and the contact portion 50B.

In addition, in Embodiment 4, an external substrate 42 is disposed so as to contact with the rear surface of the substrate 4, and the second signal electrode and the third signal electrode 73 are formed on the external substrate 42. Note that, the substrate 4 and the external substrate 42 are connected to each other by a known method such as an adhesive or screws.

The force sensor 1C according to Embodiment 4 having the above-mentioned structure is not required to have the second signal electrode 70 on the damping member 6. Therefore, for example, when the damping member 6 is replaced, it is sufficient to replace only the damping member 6. Thus, the replacement can be easily performed, and maintenance cost and the like can be reduced. In this way, even when a surface of the damping member 6 is worn out or damaged by an external force that is applied, the damping member 6 can be replaced easily and readily.

In addition, in the force sensor 1C according to Embodiment 4, if the material of the substrate 4 is the same as the material of the damping member 6, the friction coefficient of the contact surface with the vibration body 3 becomes the same (between the surface on the one side and the surface on the other side) so that a detected value can be easily controlled.

In addition, because the signal electrodes 7 are both disposed on the rear surface of the substrate 4 in parallel, they can be easily connected by patterning in the case where the substrate 4 is a printed circuit board. In addition, wiring also becomes easy.

Figure 9:
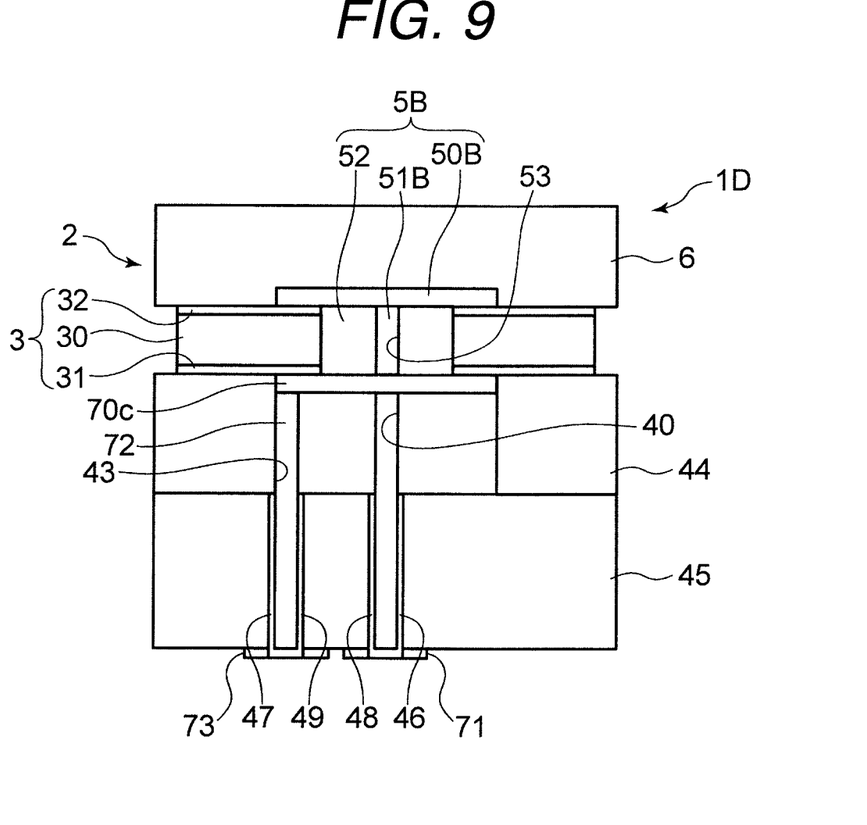
FIG. 9 is a cross sectional view schematically illustrating a modified example of the force sensor according to Embodiment 4 of the present invention.

Here, FIG. 9 illustrates a force sensor 1D of another form of the force sensor 1C according to Embodiment 4. FIG. 9 is a cross sectional view schematically illustrating a modified example of the force sensor 1C according to Embodiment 4.

As illustrated in FIG. 9, the force sensor 1D includes a first substrate 44 and a second substrate 45. The first substrate 44 is a substrate on which the vibration body 3 is mounted and has the second through hole 40 and the third through hole 43 similarly to the above-mentioned embodiment. The second substrate 45 is disposed on one side of the first substrate 44 (the side opposite to the side on which the vibration body 3 is mounted), and includes a fourth through hole 46 communicating with the second through hole 40 and a fifth through hole 47 communicating with the third through hole 43. The second substrate 45 is a printed circuit board.

A socket 48 is disposed in the fourth through hole 46, and the second signal electrode 71 is disposed on the rear surface of the second substrate 44 so as to be connected to the socket 48. In other words, there is a structure in which the connecting shaft 51B is pressed to fit in the socket 48 so that the second signal electrode 71 is electrically connected to the second drive electrode 32 via the connecting shaft 51B and the contact portion 50B.

A socket 49 is disposed in the fifth through hole 47, and the third signal electrode 73 is disposed on the rear surface of the second substrate 44 so as to be connected to the socket 49. In other words, there is a structure in which the lead-in shaft 72 is pressed to fit in the socket 49 so that the third signal electrode 73 is electrically connected to the first drive electrode 31 via the lead-in shaft 72. Note that, the sockets 48 and 49 may be a general component in which an electric component such as an IC is inserted, which can be mounted on the second substrate 45 and can be in a soldering bath.

In the state in which the piezoelectric material 30, the damping member 6, and the substrate 4 are combined, the connecting shaft 51B of the holding member 5 is inserted in the socket 48, and the lead-in shaft 72 is inserted in the socket 49. Then, the vibration body 3 and each of the second signal electrode 71 and the third signal electrode 73 on the second substrate 45 are electrically connected, respectively. Note that, the sockets 48 and 49 can be easily detached, and hence if a defect occurs in the piezoelectric material 30, the holding member 5, or the like, for example, they can be easily removed from the second substrate 45 for replacement or the like.

With this structure, the piezoelectric material 30 can be securely supplied with electric power so that a force can be detected. In addition, if the force sensor 1D is used for making a sensor that can detect a force distribution, when the second substrate 45 is a printed circuit board, wirings in matrix can be easily connected by patterning using a double-sided or multilayer substrate or the like.

Embodiment 5

Figure 10:
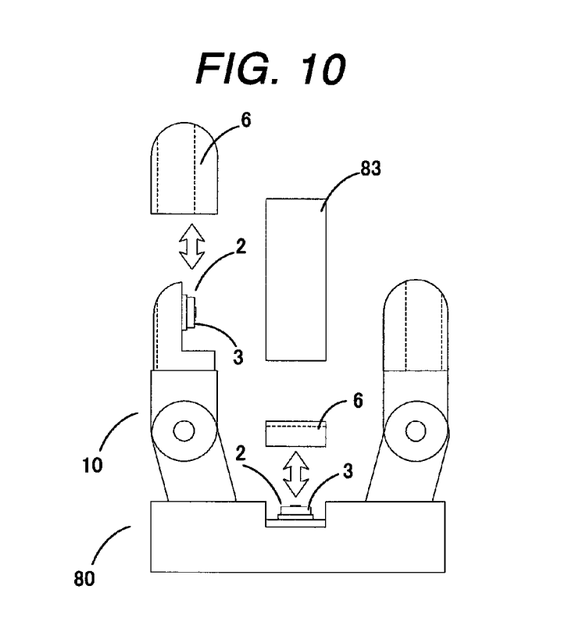
FIG. 10 is a diagram schematically illustrating a force sensor and a robot hand according to Embodiment 5 of the present invention.

Next, a force sensor and a robot hand according to Embodiment 5 of the present invention are described with reference to FIG. 10. FIG. 10 is a diagram schematically illustrating a state in which the force sensor according to Embodiment 5 is mounted on the robot finger 10 and on a palm of the robot hand.

As to the force sensors 1 of Embodiments 1 to 4, a useful effect can be obtained also when the sensor is mounted on a finger or a palm of a robot hand 80. For instance, if the force sensor 1 is mounted on the hand 80 of an assembly robot, it is considered to grasp a workpiece 83 using information from the force sensor 1. If the force sensor 1 is disposed in the hand 80, presence or absence of the workpiece 83 can be decided, or grasping force can be controlled so as to grasp the workpiece 83 with a desired force based on a signal from the force sensor 1. Because the hand 80 is usually operated to open and close fingers of the hand 80 using a motor, a reduction gear, and the like, a mechanical vibration occurs in the operation. In this case, the above-mentioned conventional piezoelectric vibration type force sensor (Japanese Patent Application Laid-Open No. S52-78473) has a problem in that a position of the vibration body 3 is shifted in the force unit 2 because of the mechanical vibration. If the fixed position is shifted, the restricted vibration amount becomes different even if the same force is applied to the same position. As a result, reproducibility of the output is lost. In other words, it is necessary for the force sensor 1 to hold the vibration body 3 at the same position without a shift in the force unit 2. According to this embodiment, it is possible to hold the vibration body 3 without a position shift due to the mechanical vibration by using a simple unit.

In addition, it is commonly performed to cover the surface of the finger with an elastic material to avoid a damage to the workpiece 83 when the robot hand 80 grasps the workpiece 83. In this sensor, the damping member 6 constituting the force sensor 1 can prevent a damage to the workpiece 83 and can also act as the member for generating a change of the output corresponding to a force.

In addition, because the damping member 6 always contacts with the workpiece 83, there occurs abrasion of the surface of the damping member 6. In addition, considering a long term use in a factory or the like, there is a problem in that hardness of the damping member 6 changes due to variation with time so that an output of the sensor may be changed. In other words, it is apparent that regular replacement of the sensor is necessary due to worn-out or variation with time. Therefore, as described in Embodiments 1 to 4, if the structure that allows easily replacement of only the damping member 6 is adopted, regular maintenance time of the hand 80 can be shortened. In addition, if only the damping member 6 is replaced, because it is not necessary to replace the entire force sensor 1, work time can be reduced so that maintenance cost can be reduced.

Embodiment 6

Figure 11:
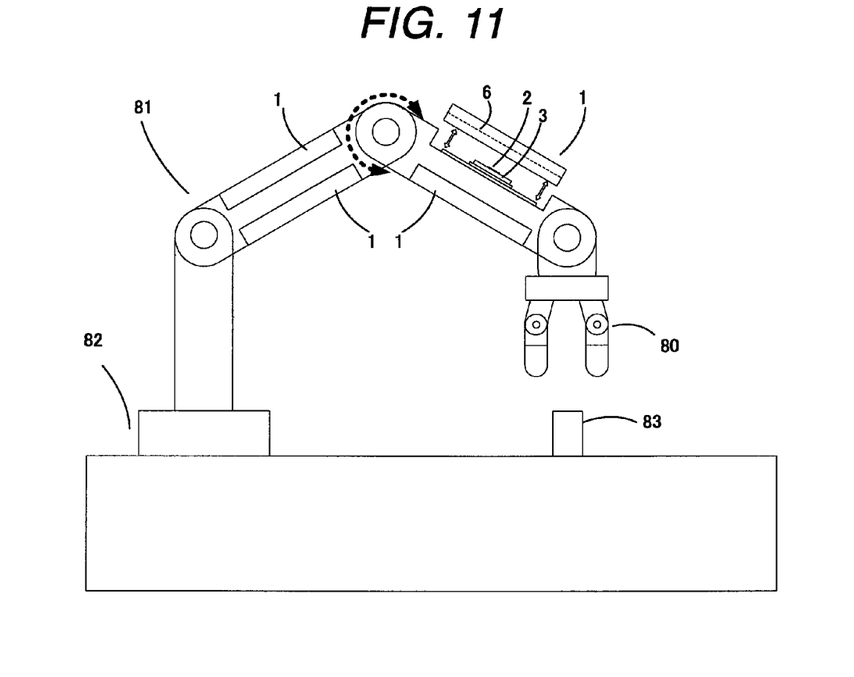
FIG. 11 is a diagram schematically illustrating a force sensor, a robot hand, and an arm according to Embodiment 6 of the present invention.

Next, a force sensor, a robot hand, and a robot arm according to Embodiment 6 of the present invention are described with reference to FIG. 11. FIG. 11 is a diagram schematically illustrating a state in which the force sensor according to Embodiment 6 is mounted on the robot hand 80 and a robot arm 81.

As to the force sensors 1 of Embodiments 1 to 5, a useful effect can be obtained also by mounting the sensor on the robot arm 81. When the force sensor 1 is used in the arm 81 of the assembly robot, it is conceivable to use information from the force sensor 1 for operating the arm 81 directly by an external signal. For instance, if the force sensor 1 is mounted to be the same direction as a rotation axis direction of the arm 81, an operator can intuitively operate the arm 81 so as to perform teaching. It is sufficient to associate the operation of the arm 81 with each of the force sensors 1.

When the arm 81 is operated in combination with many components such as a motor and a reduction gear, an acceleration and a mechanical vibration in the operation may occur in the force sensor 1. In this case, there is a problem in that a position of the vibration body 3 is shifted due to the acceleration or the mechanical vibration generated in the force unit 2. If the fixed position is shifted, the restricted vibration amount becomes different even if the same force is applied to the same position. As a result, reproducibility of the output is lost.

In other words, it is necessary for the force sensor 1 to hold the vibration body 3 at the same position without a shift in the force unit 2. According to this embodiment, it is possible to hold the vibration body 3 without a position shift due to the acceleration or the mechanical vibration by using a simple unit.

In this case too, similarly to the robot hand 80, because the damping member 6 always contacts with the operator, there is a problem of abrasion and variation with time of the surface of the damping member 6. Therefore, adopting the structure described above in Embodiments 1 to 4 in which only the damping member 6 can be easily replaced, regular maintenance time of the arm 81 can be shortened. In addition, if only the damping member 6 is replaced, because it is not necessary to replace the entire force sensor 1, maintenance cost can be reduced.

In an emergency, in order to enhance safety of contact, it is conceivable to form the surface of an elastic material such as rubber so as to soften an impact force. In this sensor, the damping member 6 constituting the force sensor 1 can act as an impact force absorbing member of the arm 81, and can also act as a member for producing a change of output due to a force.

Although the embodiments of the present invention are described above, the present invention is not limited to the above-mentioned embodiments. In addition, the effect described in the embodiments of the present invention are merely examples of most preferred effects obtained from the present invention, and hence effects of the present invention are not limited to those described in the embodiments of the present invention.

For instance, in Embodiment 1, the connecting shaft 51 is used for fastening the contact portion 50 and the loose-fit portion 52 to the substrate 4, but the present invention is not limited to this structure. For instance, it is possible to adopt a structure in which the loose-fit portion 52 is bonded to the contact portion 50 and the substrate 4 so that the contact portion 50 and the loose-fit portion 52 are fastened to the substrate 4. In this case, the connecting shaft 51 can be omitted.

In addition, in Embodiment 1, the another end portion 51a of the connecting shaft 51 is bent so that the contact portion 50 and the loose-fit portion 52 are fastened to the substrate 4, but the present invention is not limited to this structure. For instance, it is possible to adopt the method as described in Embodiments 2 and 3 for fastening the contact portion 50 and the loose-fit portion 52 to the substrate 4.

REFERENCE SIGNS LIST 1, 1A, 1B, 1C, 1D force sensor
2 piezoelectric vibration type force unit
3 vibration body
4 substrate
5 holding member
6 damping member (elastic member)
7 signal electrodes
10 robot finger
11 impedance
12 variable frequency oscillator
30 piezoelectric material
31 first drive electrode (pair of drive electrodes)
32 second drive electrode (pair of drive electrodes)
50 contact portion
51 connecting shaft (shaft member)
52 loose-fit portion
70 first signal electrode
71 second signal electrode
80 robot hand
81 robot arm
82 robot apparatus
83 workpiece While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-029737, filed Feb. 15, 2011, and Japanese Patent Application No. 2012-019708, filed Feb. 1, 2012, which are hereby incorporated by reference herein in their entirety.

What is claimed is:

1. A piezoelectric vibration type force sensor, comprising:
a vibration body including a ring-shaped piezoelectric material having a hollow through hole and a pair of drive electrodes attached to both sides of the piezoelectric material, for vibrating in a spreading direction of the piezoelectric material when an AC voltage is applied to the pair of drive electrodes;
a substrate to be brought into contact with a surface on one side of the vibration body;
an elastic member that is disposed to be brought into contact with a surface on another side of the vibration body, for transmitting a force applied externally to the vibration body by elastic deformation;
a holding portion including a contact portion that is larger than the hollow through hole and that does not protrude from an outer circumferential portion of the vibration body so as to be brought into contact with the surface on the another side of the vibration body, and a loose-fit portion that loosely fits in the hollow through hole, the loose-fit portion being fastened to the substrate; and
a pair of signal electrodes for applying the AC voltage to the pair of drive electrodes.

2. The piezoelectric vibration type force sensor according to claim 1,
wherein the loose-fit portion in the holding portion has a first through hole formed in a direction crossing a vibration direction of the vibration body, and the substrate has a second through hole, and
wherein the piezoelectric vibration type force sensor further comprises a shaft member piercing the first through hole and the second through hole, and a shaft member including one end to be connected to the contact portion and another end portion to be fastened to the substrate.

3. The piezoelectric vibration type force sensor according to claim 2, wherein the another end portion of the shaft member is bent to be fastened to the substrate after passing through the second through hole of the substrate.

4. The piezoelectric vibration type force sensor according to claim 2,
wherein the second through hole is provided with a press fit member for crimping the another end portion of the shaft member to the substrate, and
wherein the another end portion of the shaft member is fastened to the substrate via the press fit member.

5. The piezoelectric vibration type force sensor according to claim 2,
wherein the loose-fit portion is formed of an insulating material, and the contact portion and the shaft member are formed of a conductive material, and wherein the pair of signal electrodes comprise a first signal electrode that is attached to a front surface of the substrate contacting with the surface on the one side of the vibration body so as to be brought into contact with a drive electrode on the surface on the one side of the vibration body, and a second signal electrode that is attached to a rear surface of the substrate so as to be brought into contact with the another end portion of the shaft member and to be electrically connected to a drive electrode on the surface on the another side of the vibration body via the shaft member.

6. The piezoelectric vibration type force sensor according to claim 5,
wherein the substrate has a third through hole formed in parallel to the second through hole, and
wherein the piezoelectric vibration type force sensor further comprises a lead-in shaft formed of a conductive material, including one end connected to the first signal electrode, and a third signal electrode that is disposed in parallel to the second signal electrode on the rear surface of the substrate so as to be brought into contact with the lead-in shaft passing through the third through hole and to be electrically connected to the first signal electrode.

7. A robot hand comprising the piezoelectric vibration type force sensor according to claim 1 mounted on a part of the robot hand including a robot finger.

8. A robot arm comprising the piezoelectric vibration type force sensor according to claim 1 mounted on a part of the robot arm including an arm portion.

9. A piezoelectric vibration type force sensor, comprising:
a vibration body including a ring-shaped piezoelectric material having a hollow through hole and a pair of drive electrodes attached to both sides of the piezoelectric material, for vibrating in a spreading direction of the piezoelectric material when an AC voltage is applied to the pair of drive electrodes;
a substrate to be brought into contact with a surface on one side of the vibration body;
an elastic member that is disposed to be brought into contact with a surface on another side of the vibration body, for transmitting a force applied externally to the vibration body by elastic deformation;
a holding portion including a contact portion that is larger than the hollow through hole and that does not protrude from an outer circumferential portion of the vibration body so as to be brought into contact with the surface on the another side of the vibration body, and a loose-fit portion which is vacant space in the hollow through hole, the loose-fit portion being fastened to the substrate; and
a pair of signal electrodes for applying the AC voltage to the pair of drive electrodes.

10. A robot hand comprising the piezoelectric vibration type force sensor according to claim 9 mounted on a part of the robot hand including a robot finger.

11. A robot arm comprising the piezoelectric vibration type force sensor according to claim 9 mounted on a part of the robot arm including an arm portion.

* * * * *